United States Patent
Jain et al.

(10) Patent No.: US 9,413,713 B2
(45) Date of Patent: Aug. 9, 2016

(54) DETECTION OF A MISCONFIGURED DUPLICATE IP ADDRESS IN A DISTRIBUTED DATA CENTER NETWORK FABRIC

(71) Applicant: Cisco Technology, Inc., San Jose, CA (US)

(72) Inventors: Vipin Jain, San Jose, CA (US); Anil Lohiya, Cupertino, CA (US); Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 14/097,747

(22) Filed: Dec. 5, 2013

(65) Prior Publication Data

US 2015/0163192 A1     Jun. 11, 2015

(51) Int. Cl.
| | |
|---|---|
| *H04L 12/28* | (2006.01) |
| *H04L 12/56* | (2006.01) |
| *H04L 29/12* | (2006.01) |
| *G06F 9/455* | (2006.01) |

(52) U.S. Cl.
CPC .......... *H04L 61/103* (2013.01); *G06F 9/45558* (2013.01); *H04L 61/2046* (2013.01); *G06F 2009/45595* (2013.01); *H04L 61/20* (2013.01); *H04L 61/2007* (2013.01); *H04L 61/2092* (2013.01)

(58) Field of Classification Search
CPC . H04L 61/1541; H04L 61/20; H04L 61/2007; H04L 61/2015; H04L 61/2061; H04L 61/2076; H04L 61/6022
See application file for complete search history.

(56) References Cited

U.S. PATENT DOCUMENTS

| | | | | |
|---|---|---|---|---|
| 6,925,079 B2* | 8/2005 | Matsukawa | ....... | H04L 29/12018 370/250 |
| 2004/0008694 A1* | 1/2004 | Guo | ...................... | H04L 45/586 370/395.52 |
| 2010/0316019 A1 | 12/2010 | Liu et al. | | |
| 2011/0274111 A1* | 11/2011 | Narasappa | .......... | H04L 12/4633 370/392 |
| 2011/0299534 A1* | 12/2011 | Koganti | ............. | H04L 12/4625 370/392 |
| 2012/0163388 A1* | 6/2012 | Goel | ................... | H04L 12/4641 370/395.53 |

(Continued)

OTHER PUBLICATIONS

Nordmark, et al., "FCFS SAVI: First-Come, First-Served Source Address Validation Improvement for Locally Assigned IPv6 Addresses," Internet Engineering Task Force (IETF), Request for Comments: 6620, Category: Standards Track, May 2012, pp. 1-35.

*Primary Examiner* — Christopher Crutchfield
*Assistant Examiner* — Abu-Sayeed Haque
(74) *Attorney, Agent, or Firm* — Edell, Shapiro & Finnan, LLC

(57) ABSTRACT

Presented herein are techniques to detect a misconfigured duplicate Internet Protocol (IP) address in a distributed data center network fabric. A network topology is provided that includes a plurality of network elements. A network element receives a configuration message comprising an IP address from a first host associated with the first network element. The IP address is detected to already be in use by a second host associated with a second network element. A request message is provided to the second network element, the request message configured to cause the second network element to attempt to contact the second host. A reply message is received from the second network element. If the reply message indicates that the second host exists at the second network element, an indication of a misconfiguration event is generated. Otherwise, the IP address is associated with the first host.

20 Claims, 5 Drawing Sheets

(56) References Cited

U.S. PATENT DOCUMENTS

| | | | |
|---|---|---|---|
| 2013/0145008 A1* | 6/2013 | Kannan | H04L 45/586 709/223 |
| 2013/0166723 A1* | 6/2013 | Christenson | H04L 69/40 709/224 |
| 2014/0283077 A1* | 9/2014 | Gallella | G06F 21/53 726/24 |
| 2014/0328343 A1* | 11/2014 | Kapadia | H04L 45/741 370/392 |
| 2015/0139250 A1* | 5/2015 | Fung | H04L 41/142 370/503 |

* cited by examiner

DETECTION OF A MISCONFIGURED DUPLICATE IP ADDRESS IN A DISTRIBUTED DATA CENTER NETWORK FABRIC

TECHNICAL FIELD

The present disclosure relates to detecting duplicate network identifiers in a network environment.

BACKGROUND

In data center environments, rack units may house many server devices. Each server device may be configured to host one or more virtual host (virtual machine) devices. The servers in the rack units are connected to top-of-rack (ToR) leaf switch devices. The leaf switches, in turn, are connected to other leaf switches via one or more spine switches to form a layer 3 distributed fabric. Network switches form a physical underlay network, which may be used by multiple tenant overlay networks that exchange data communications between host devices (physical and/or virtual) in different rack units. For example, packets of data communications may be sent from a virtual machine in one rack unit to a virtual machine in another rack unit. These packets may be routed between corresponding leaf switch devices and the intermediary spine switch. The leaf switches are configured to store address information associated with the host devices in the data center environment. An important aspect of network orchestration is to ensure that multiple physical or virtual hosts do not share the same Internet Protocol (IP) address in a given IP routing domain.

DESCRIPTION OF EXAMPLE EMBODIMENTS

Overview

Presented herein are techniques to detect a misconfigured duplicate Internet Protocol (IP) address in a distributed data center network fabric. A network topology is provided that includes a plurality of network elements. A network element receives a configuration message comprising an IP address from a first host associated with the first network element. The IP address is detected to already be in use by a second host associated with a second network element. A request message is provided to the second network element, the request message configured to cause the second network element to attempt to contact the second host. A reply message is received from the second network element. If the reply message indicates that the second host exists at the second network element, an indication of a misconfiguration event is generated. If the reply message indicates that the second host does not exist at the second network element, the IP address is associated with the first host.

Example Embodiments

Figure 1:
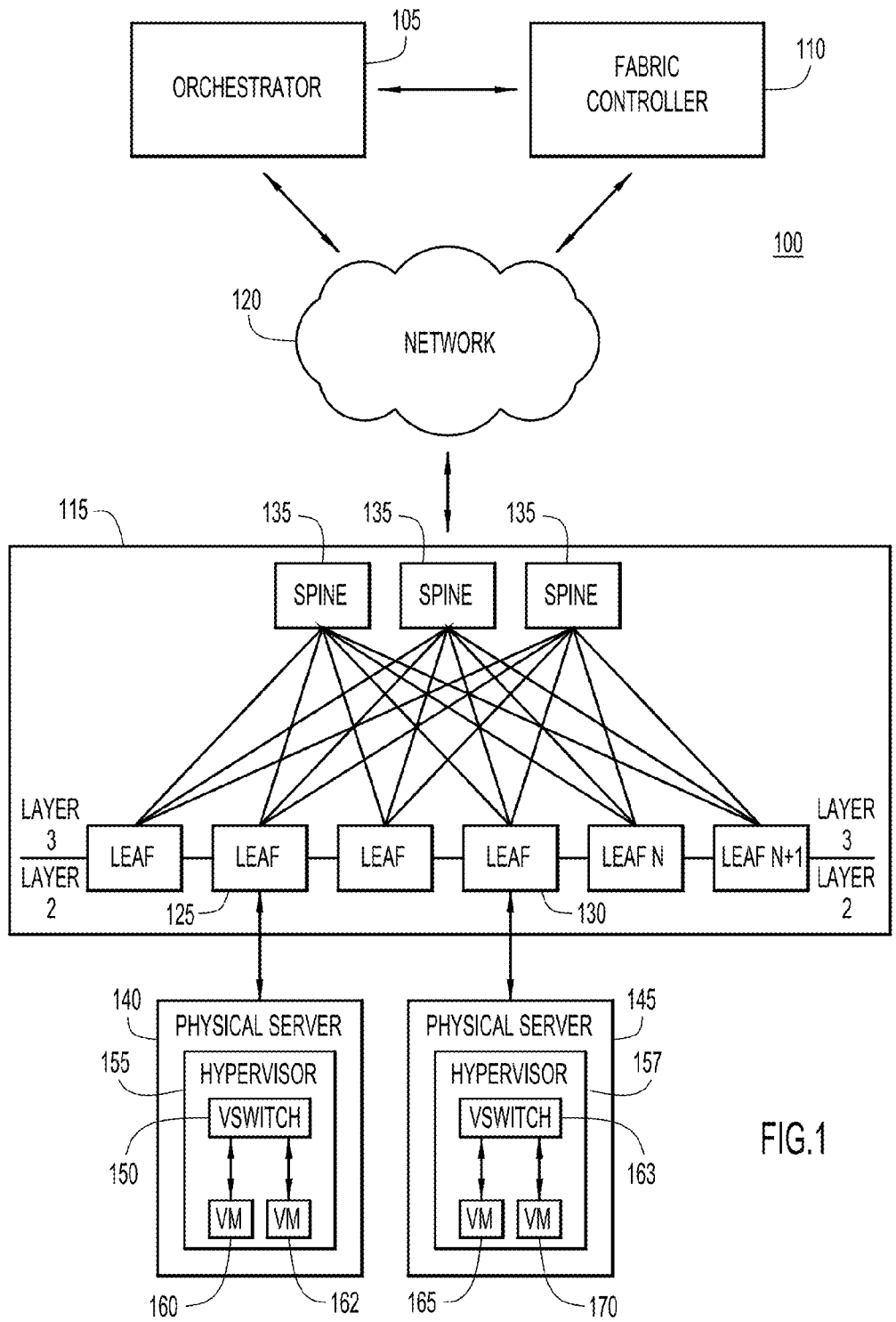
FIG. 1 shows an example system or network topology including one or more virtual machines communicating with one or more virtual switches hosted by one or more physical servers, each of the virtual switches being configured to send packets through corresponding leaf or top-of-rack (ToR) switches connected to a distributed fabric.

Reference is first made to FIG. 1. FIG. 1 shows a system 100 in which an orchestrator 105 may coordinate with a fabric controller 110 to create, modify, provision and/or delete one or more tenant overlay networks in a physical leaf/spine underlay distributed fabric 115 via network 120. While a physical leaf/spine topology with tenant overlay networks is used as an example, any network architecture with a physical underlay network and logical overlay networks would be consistent with techniques presented herein. Each leaf in the topology may be a leaf switch (e.g. top-of-rack (ToR) switches 125 or 130) located in a rack unit that houses one or more network elements, such as physical servers. Each leaf switch is configured to route communications between physical servers in the rack unit and other network elements via spine switches 135. Each leaf may act as a gateway from a layer 2 network (e.g. Ethernet) onto the distributed fabric 115 which operates at layer 3. Each physical server (e.g. server 140 associated with leaf switch 125, or server 145 associated with leaf switch 130) may host one or more virtual switches 150 and virtual hosts (virtual machines) 160 and 165. Virtual switches and virtual machines may be created and run on each physical server on top of a hypervisor 155. It is appreciated that any number of leaf switches and spine switches may be present in the fabric 115.

Each virtual switch 150 may be configured to manage communications of one or more virtual machines in particular virtual networks and/or subnetworks (subnets). Each virtual switch 150 may be embodied by software stored and executed on the physical server 140. Thus, the virtual switch 150 performs functions of a physical switch device. Similarly, each virtual machine 160 may be software stored and executed on the physical server 140. The virtual machine 160 is configured to exchange communications with other virtual machines via the fabric 115. It is appreciated that any number of physical servers hosting any number of virtual switches and virtual machines may be present in the system 100. For simplicity, FIG. 1 shows one physical server 140 associated with leaf switch 125 and one physical server 145 associated with leaf switch 130. FIG. 1 also shows physical server 140 hosting hypervisor 155, which may run one or more virtual switches, such as virtual switch 150 (Vswich), each being associated with one or more virtual machines, such as virtual machines 160 and 162. Similarly, physical server 145 may host hypervisor 157, which may create and run one or more virtual switches such as virtual switch 163, each being associated with one or more virtual machines, such as virtual machines 165 and 170.

Though not shown in FIG. 1, the physical server 140 associated with leaf switch 125 may be housed in a rack unit or "rack." Other physical servers may also be housed in the rack. Leaf switches 125 and 130 are responsible for managing communications (e.g., routing and forwarding) originating from and destined for physical servers (and virtual machines and virtual switches hosted by the physical servers) in the rack. Hence the term "top-of-rack" (ToR) ascribed to switches 125 and 130, and any other leaf switch in FIG. 1.

Leaf switches 125 and 130 may be used to provide redundancy and fault-tolerance for communications associated with physical servers, virtual machines and virtual switches in the rack. Thus, leaf switch 125 is a peer to leaf 130, and vice versa. These leaf switches may be configured to communicate by a network controller unit ("controller"), e.g., fabric controller 110, which may be configured to manage communications between leaf switches in different racks.

As stated above, physical server 140 hosts the virtual switch 150 and virtual machine 160. Each virtual machine is a member of an overlay tenant network. A tenant network is a unique layer 3 subnet which may contain one or more VLANs. A subnet is a logical subdivision of an IP network. For example, a tenant Company A has 2 tiers/tenant networks namely 1.1.1.0/24 and 2.2.2.0/24. As the tenant network of which virtual machine 160 is a member "joins" the network, it may be provisioned with certain network attributes in order to exchange communications. Upon instantiation, a tenant network and a virtual machine therein may be provisioned with virtual network segmentation resources. For example the virtual machine and tenant network may be associated with one or more virtual Local Area Network (VLAN) identifiers, and a subnet identifier. In one example, virtual network segmentation resources may be provisioned on a per-switch or per-port basis (e.g., up to four thousand VLANs per switch or four thousand per port of a switch). Thus, when a tenant network and virtual machine therein are created, a leaf switch may select an unused VLAN for a given segmentation assignment. The virtual segmentation resources may also include a Switch Virtual Interface (SVI) assignment, an Access Control List (ACL) assignment, a Quality of Service (QoS) assignment, a Virtual Routing and Forwarding (VRF) assignment, etc. It should be appreciated that other network information now known or hereinafter developed may also be assigned to the virtual machine. Each tenant network is also associated with a segment identifier (segment ID), which is used to uniquely identify the tenant network in the leaf/spine fabric 115. A segment ID is a 24-bit identifier that allows more than 16 million unique tenant networks to be addressed. Virtual Extensible LAN (VXLAN) is a specific type of Media Access Control (MAC) over IP/User Datagram Protocol (UDP) encapsulation scheme that has a VNI (virtual network identifier) which also happens to be 24-bits. However, the term "segment" as used herein is more generic than a VNI in that it is an identifier, but it does not dictate that the overlay encapsulation should be VXLAN or any other encapsulation scheme.

Upon instantiation, the virtual machine 160 may be provisioned with identifier information that may include an IP address, a MAC address, a port number associated with the VLAN to which it is assigned, etc. Tenant network and tenant network element instantiation, modification and deletion may be performed by the orchestrator 105, while segmentation resources may be stored on a network database on the controller 110. The orchestrator 105 may perform such functions, either automatically or via user interaction with a graphical user interface (GUI), as creating virtual machines, associating virtual machines with a storage, deleting virtual machines, attaching networks, moving virtual machines from one physical server to another (a motion/mobility event), ensuring that virtual machines are associated with storage after a mobility event, etc. The orchestrator 105 may make changes to the fabric by issuing software instructions to the controller 110 and/or hypervisor.

The orchestrator 105 and controller 110 may operate outside of the leaf/spine fabric 115. The VMware™ suite is an example orchestrator solution. Orchestrator 105 software may include software such as vCloud Director™, vCenter Server™, OpenStack™, and vShield Manager™, though other software solutions may be able to perform the functions of the orchestrator 105 according to techniques presented herein. The orchestrator 105 may additionally coordinate with a Dynamic Host Configuration Protocol (DHCP) server on the controller 110 to provide unique IP address information to allow virtual machines to communicate over an IP network. Once the virtual machine (VM) 160 is instantiated with resources, which may also include assigning one or more network identifiers such as a subnet or VLAN to the VM's virtual network interface card (vNIC), the VM 160 becomes capable of exchanging communications with other VMs (that have also been properly instantiated) in the network.

The controller 110 may interact with the leaf/spine fabric 115 on behalf of the orchestrator 105. The controller may monitor all events occurring at the orchestrator via application programming interfaces (APIs), store these events in a cache, and provide data to and perform actions on network elements in the leaf/spine fabric 115 as needed and/or in response to orchestrator events. The controller allows the user to manage all the devices in the fabric from a central console. Common configuration information and processes can be applied to devices grouped by type or by role, thus simplifying large-scale policy updates without the need to touch individual systems. Controller functions may include VM auto-deployment, integrated fabric access, topology views, and monitoring and network health checks.

Leaf switches may also query the orchestration system, for e.g. controller 110 via APIs for information, to retrieve data about the orchestrator, or retrieve information about events such as orchestrator-generated events. For example, the controller 110 may maintain a cache of all VM mobility events, such as if VM 160 were to be moved from physical server 140 to physical server 145. The leaf switches may poll the controller 110 to learn of a VM mobility event.

As discussed above, VMs may be assigned an IP address upon creation. IP misconfigurations may result in two virtual or physical devices having the same IP address. Duplicate IP addresses may cause network traffic to be split and/or directed to unintended recipients. These misconfigurations may occur as a result of VM mobility events, VM creation events, and IP address modifications. In traditional networks, when a duplicate IP address is advertised, such as via gratuitous or standard Address Resolution Protocol (GARP, ARP, etc.) address request messages, other network elements may detect the misconfiguration and respond before the Transmission Control Protocol (TCP)-IP stack of the new network element is enabled, thus avoiding traffic disruptions. However, in a distributed gateway leaf/spine architecture, subnets can span leaf switches. This means that a subnet may be partly located, for example, on a physical server under a first leaf switch, and partly located on another physical server under a second leaf switch, and thus two portions of a layer 2 network are split by a layer 3 network. GARP messages are not necessarily forwarded by leaf switches onto the distributed fabric 115. The leaf/spine architecture may be a very large fabric, resulting in a large number of ARP/GARP messages sent across the fabric to each host, so this method may be avoided. Rather, control protocols between leaf switches may be sent across the fabric in part to reduce traffic. As a result, misconfigurations may not be detected in a distributed fabric topology 115. Since a subnet and VLAN can span multiple leaf switches, this means that a VM may move from a physical server under one leaf switch to a physical server on a second leaf switch yet remain in the same subnet. A mechanism is needed to detect a misconfiguration in a distributed fabric architecture, and yet allow valid VM mobility events.

Figure 2:
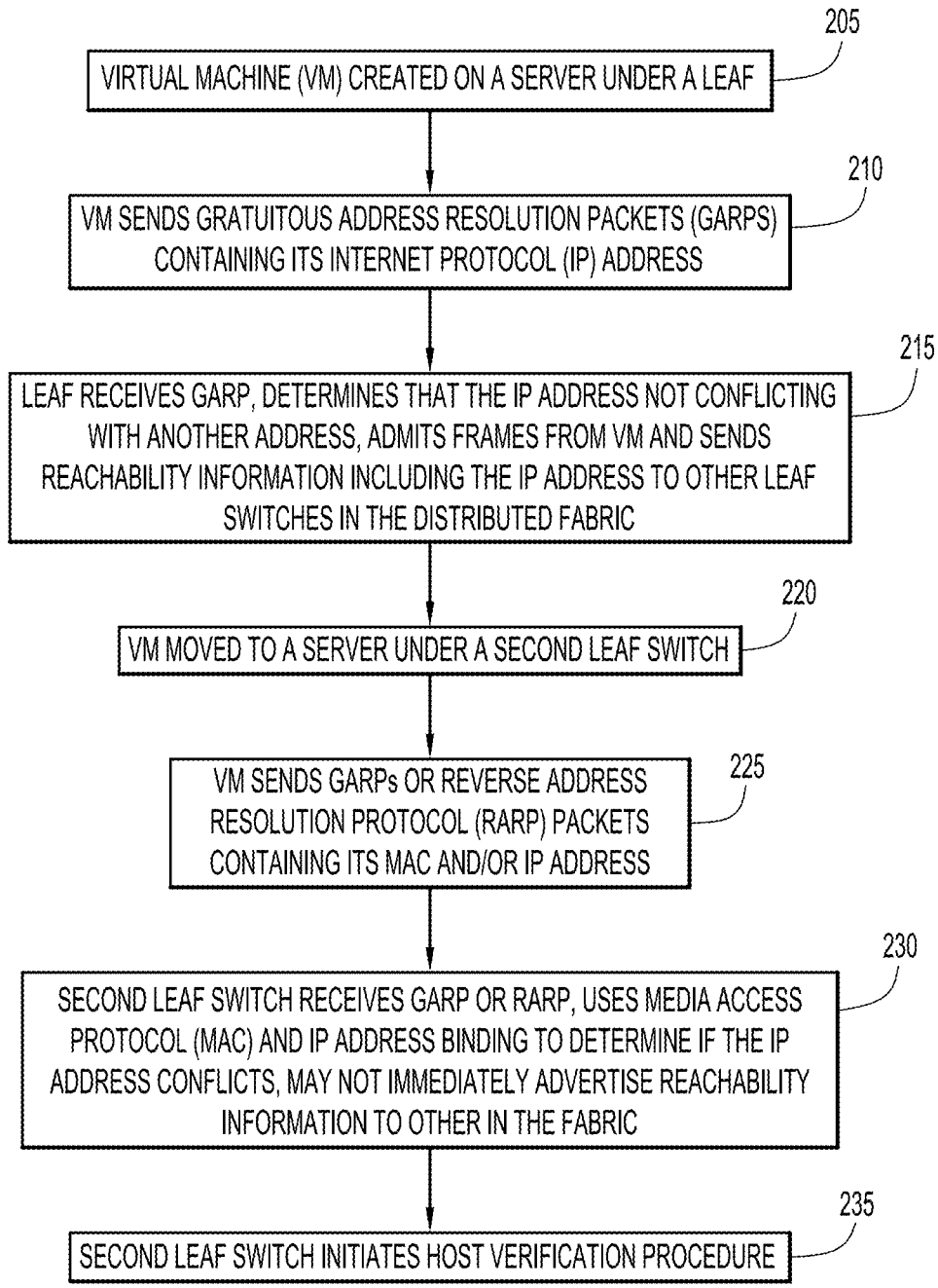
FIG. 2 shows an example flow chart depicting operations to create and move a virtual machine (VM) according to techniques presented herein.

An example flow chart depicting operations to create and move a virtual machine from under one leaf switch to another is shown in FIG. 2. Reference is also made to FIG. 1 for purposes of this description of FIG. 2. At step 205, a virtual machine, for e.g. VM 160 may be created on a physical server 140 associated with a leaf switch 125. After the VM is provisioned at step 210, the VM's TCP-IP stack may become active, and the VM may send GARP messages advertising reachability information such as the VM's IP address and MAC address to other network elements (switches, routers, hosts, etc.) on the local network. If a network element with a conflicting IP address receives the GARP message, it may respond with a message indicating that there is a duplicate IP address. GARP messages, however, are possibly not forwarded from the leaf switch on to the layer 3 leaf/spine fabric. Thus, not all network elements in the subnet may be informed of the new VM. Leaf switches, however, may maintain a table of IP addresses and MAC addresses for the tenant network (for e.g., ARP table/ARP cache). If, at step 215, the leaf switch 125 receives the GARP message and determines that the IP address is not conflicting with another by checking its IP address table (not being used by another VM or physical host in the network), the leaf switch may then admit frames from the new VM and advertise reachability information to other network elements in the layer 3 leaf/spine architecture using, for example, a control protocol such as a Border Gateway Protocol (BGP, MP-BGP, etc.). Other leaf switches may store the reachability information, which may comprise IP and MAC addresses, etc., such that all leaf switches in the distributed fabric will be able to forward packets to the new VM in the future.

At step 220, a VM mobility event occurs. For example, the VM 160 may be moved from server 140 under one switch 125 to server 145 under leaf switch 130. This event may be initiated at the orchestrator, and executed at the controller. The relevant leaf switches 125 and 130 may not be immediately notified of this move. At step 225, the newly relocated VM may send GARP or Reverse Address Resolution Protocol (RARP) messages advertising its reachability. Upon receiving a GARP message on a local port at step 230, the leaf switch 130 may access an internal IP address table and determine that the IP address is already being used by a VM under leaf 125. Alternatively, if a RARP message is received at step 230, the leaf switch 130 may access an internal MAC address table to access the IP information of the host and determine that the IP address is already being used by a VM under leaf 125. A duplicate IP address has thus been detected, and a host verification procedure is required at step 235 to determine whether or not it is a misconfiguration. Other methods of duplicate IP address detection would be within the scope of techniques presented herein.

There are multiple reasons a duplicate IP address may be detected, some valid and some not. The first is that there is a valid VM mobility event, as discussed above. Another valid scenario would be if a VM is deleted, and another VM is shortly thereafter created provisioned with the same IP address as the deleted VM, but under a different leaf switch. A physical or virtual host may also have a backup network interface controller (NIC), which connects a computer to a network. If the primary NIC fails, the backup NIC may take over. This may be detected by the leaf switch as a duplicate IP address, although this is a valid scenario. Another possibility is that a duplicate static IP address has been assigned, perhaps by a user, to a VM to produce the IP conflict, which is a misconfiguration. A further possibility is that a spurious/misbehaving host is attempting to take over a host's identity. The host verification procedure may take steps to distinguish these valid scenarios from misconfigurations. Other valid and invalid duplicate IP address detection scenarios are within the scope of techniques presented herein.

Figure 3:
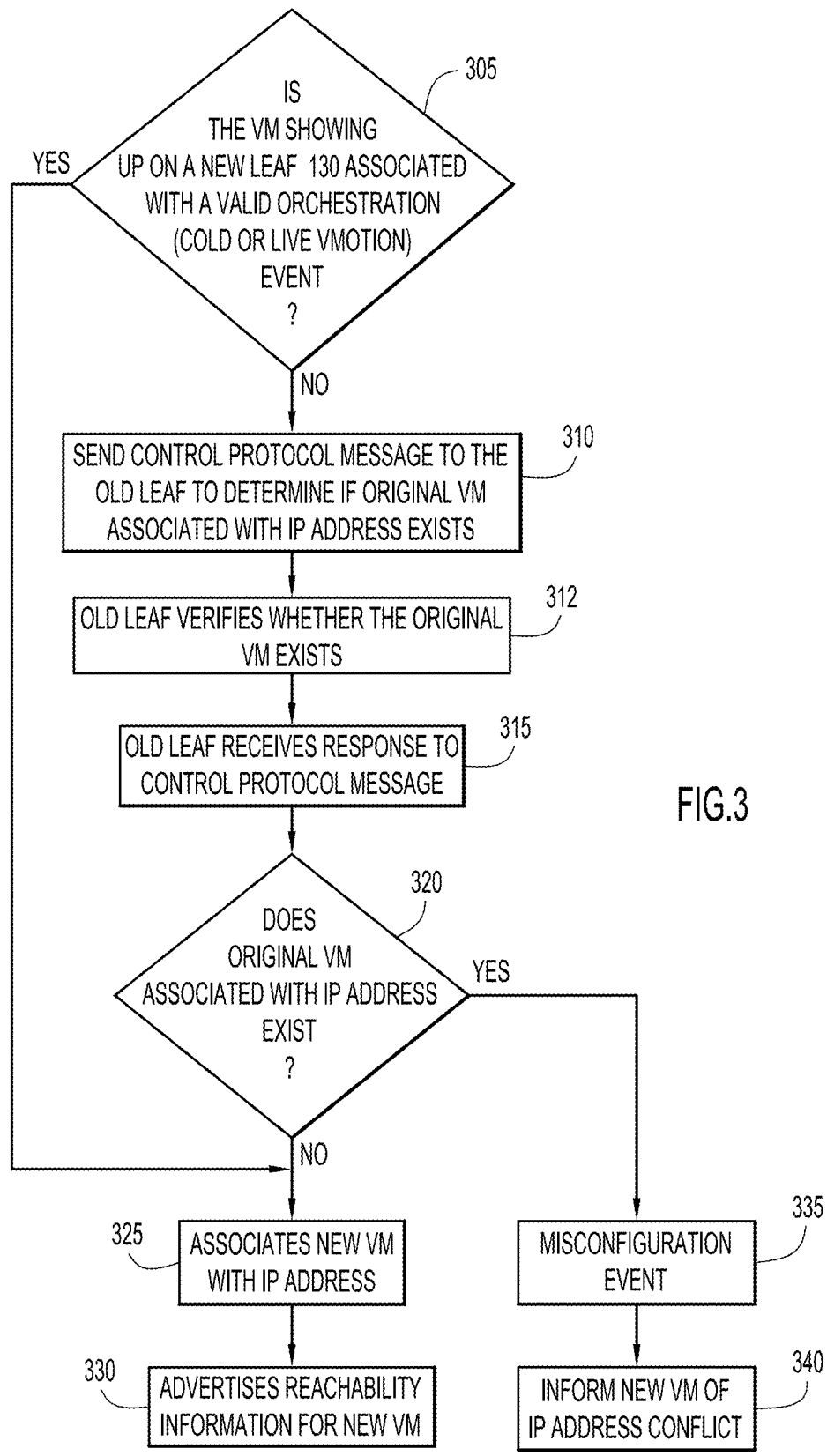
FIG. 3 shows an example flow chart depicting overall operations to perform a host verification procedure according to techniques presented herein.

FIG. 3 depicts example operations of a host verification procedure that either determines that a host has a valid IP address, or that there has been a misconfiguration event. Reference is also made to FIG. 1 for purposes of this description of FIG. 3. For example, at step 305, leaf switch 130 (the "new" or destination leaf) may have detected a new VM 165 on a local port claiming the same IP address as VM 160 associated with leaf switch 125. Instead of immediately advertising the reachability of VM 165 to the other leaf switches, leaf 130 may initiate a host verification procedure. At step 305 leaf switch 130 may first query the orchestration system, for example, an API of the controller 110, to determine if the VM 165 is associated with a known and valid VM mobility event (a valid cold or live virtual machine movement orchestration event). This step may be called management plane verification. As discussed previously, the controller 110 may maintain a cache of VM mobility events initiated at the orchestrator. In an alternative technique, the controller may actively notify all leaf nodes of network mobility events, such as VM mobility events. If leaf switch 130 receives a response that it is a known VM mobility event, the host has been validated, and step 325 is performed, which will be discussed below. If the controller or other responding network element does not have a record of a related VM mobility event, the VM 165 has not yet been validated and the host verification procedure continues. At step 310, leaf switch 130 may send a message, for example via a control protocol message such as Internal BGP (iBGP), to leaf switch 125 (the originating or "old" leaf) requesting a verification of host 160. The message may contain, for example, an indicator such as a bit flag to signal to leaf switch 125 that the message is a host verification request. At step 312, leaf switch 125 may check if VM 160 still exists by sending an ARP or Neighbor Discovery (ND) message, etc. Leaf switch 125 will either receive a response from the still existing VM 160, or receive nothing, possibly because VM 160 has been deleted or moved, or the IP address has been changed, etc. At step 315, leaf switch 125 may respond to leaf switch 130 with a control protocol message indicating whether VM 160 with the conflicting IP address still exists (positive or negative acknowledgement). At step 320, if VM 160 no longer exists (negative acknowledgment), at step 325 VM 165 may be associated with the new IP address. Leaf 130 may update its IP table accordingly. At step 330, leaf 130 may advertise reachability information for VM 165 to other leaf nodes in the leaf/spine fabric. Network traffic to and from VM 165 may now be sent.

If VM 160 using the IP address still exists, there is a misconfiguration event. At step 335, the event may be logged. Logging misconfiguration events allows users to monitor network health, and track if a given VM is repeatedly behaving undesirably. If the number of misconfiguration events associated with a VM rises above a predetermined threshold, the associated leaf switch may disable the local port used by the VM. In one technique, a user may set the predetermined threshold of spurious/misconfiguration events to disable a local port. This action may be performed selectively, as disabling a given port may deny distributed fabric access to more than one VM. At step 340, VM 165 may be notified of the duplicate IP address. For example, the VM may be informed of the conflict by some proxy, such as the new leaf 130 responding with an ARP on behalf of the host connected to the old leaf. In FIG. 2 and FIG. 3, example protocols were discussed, although other protocols would be within the scope of techniques presented herein.

As a result of these techniques, even in a distributed fabric leaf/spine architecture such as that shown in FIG. 1, duplicate host IP addresses may be detected and managed. By verifying the validity of the host before advertising its reachability to other leaf switch nodes, traffic splitting and other problems caused by duplicate IP addresses may be avoided. A new VM with a duplicate IP address would only have one route available—the route to the leaf switch, while the original VM with the same IP address may otherwise be able to communicate normally on the network. Further, for a valid VM mobility event a leaf switch may query the controller immediately, and thus a host verification procedure is not necessarily performed. This may minimize the convergence penalty for a genuine VM mobility event. This also allows the leaf switches to control when IP address updates occur across the distributed fabric, rather than individual, and possibly misconfigured, hosts.

Figure 4:
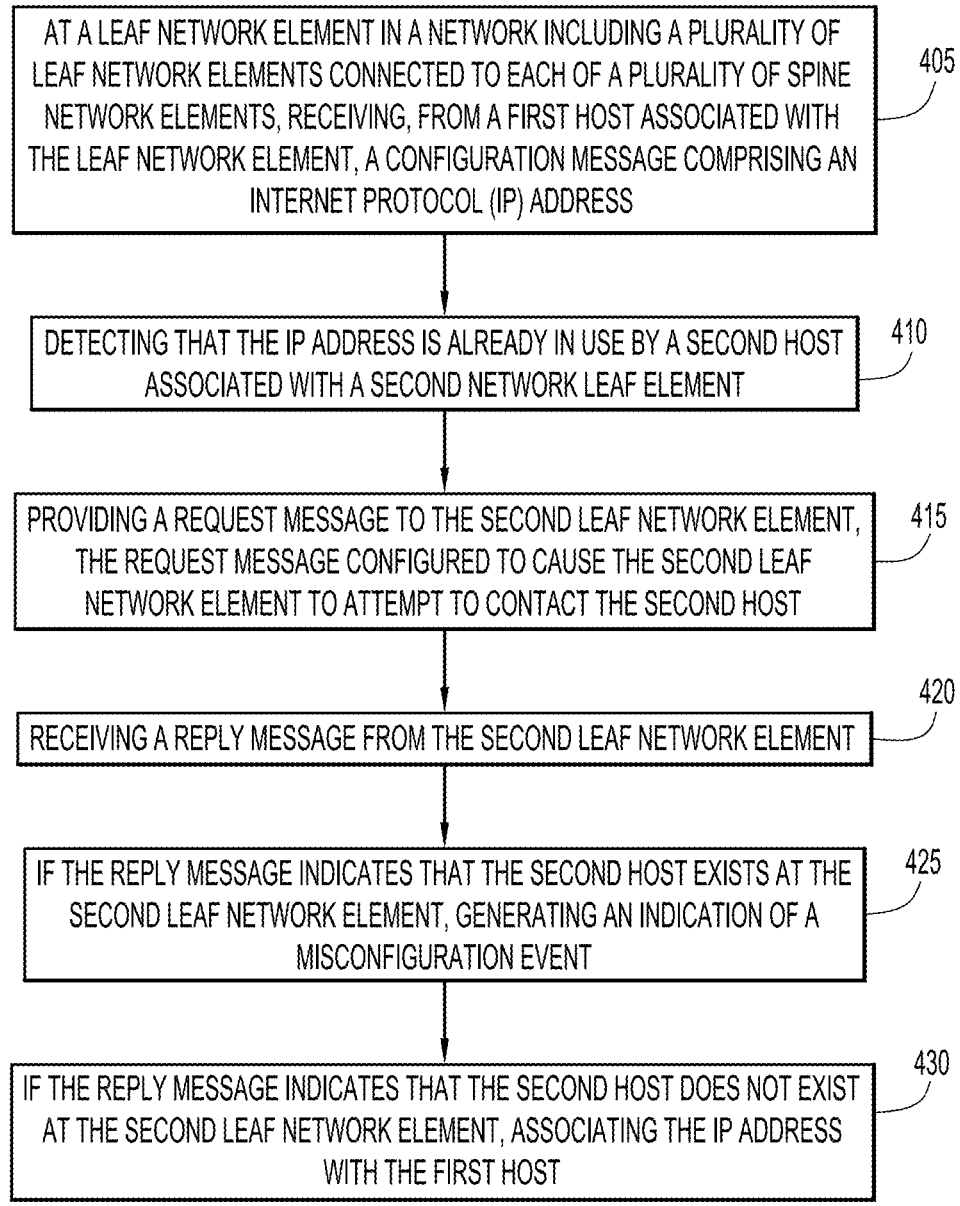
FIG. 4 shows an example flow chart depicting operations to perform a host verification procedure according to techniques presented herein.

FIG. 4 shows an example flow chart depicting overall operations to perform host verification according to techniques presented herein. At step 405, a configuration message or address advertisement message comprising an IP address is received at a leaf network element in a network including a plurality of leaf network elements connected to each of a plurality of spine network elements, from a first host associated with the leaf network element. At step 410, the leaf switch may detect that the IP address is already in use by a second host associated with a second leaf network element, and provide a request message at step 415 to the second leaf network element, the request message configured to cause the second leaf network element to attempt to contact the second host. At step 420, the leaf switch may receive a reply message from the second leaf network element. If the reply message indicates that the second host exists at the second leaf network element, at step 425 the leaf switch may generate an indication of a misconfiguration event. If the reply message indicates that the second host does not exist at the second leaf network element, at step 430 the leaf switch may associate the IP address with the first host.

Figure 5:
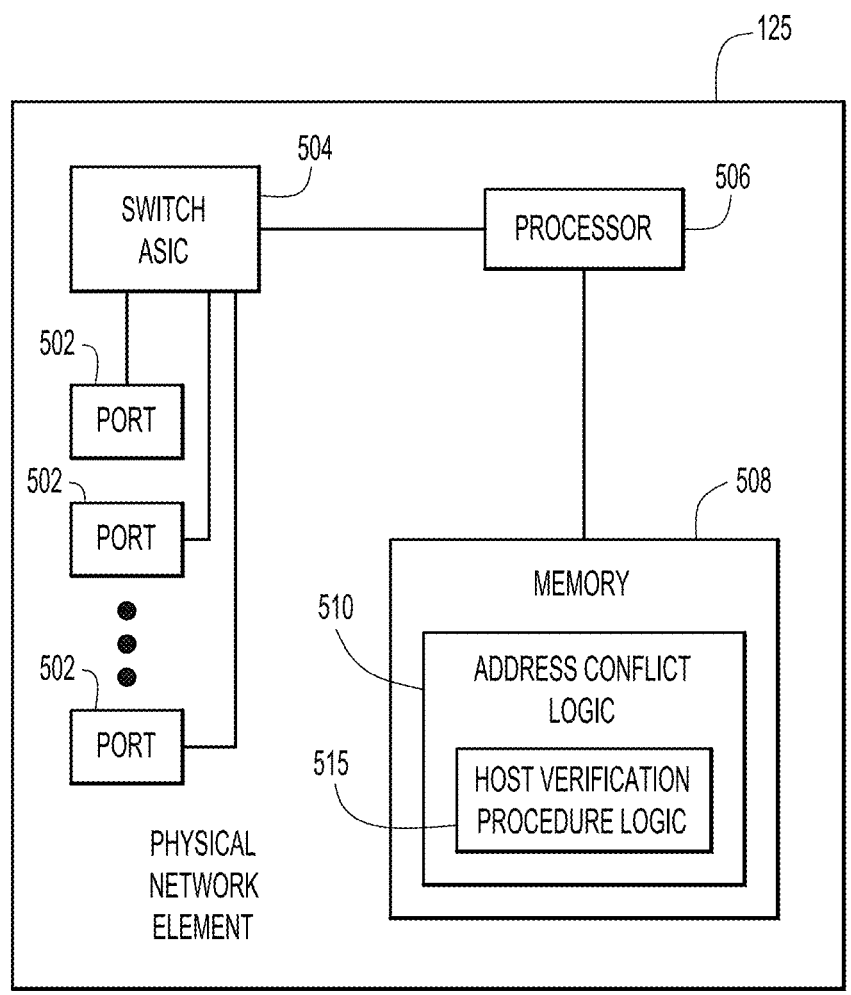
FIG. 5 shows an example block diagram of a leaf switch configured to provide network access to tenant networks and perform a host verification procedure according to techniques presented herein.

FIG. 5 shows an example block diagram of a physical leaf switch that is provisioned to provide network access to tenant networks, and which monitors the IP addresses of hosts according to techniques presented herein. For simplicity, the leaf switch device in FIG. 5 is identified by reference numeral 125, though it should be appreciated that the leaf switch device 125 may be any of the leaf switch/leaf devices in the network fabric 115 shown in FIG. 1. The leaf switch device 125 comprises, among other components, a plurality of network ports 502, a switch application specific integrated circuit (ASIC) unit 504, a processor 506 and a memory 508. The ports 502 are configured to receive communications (e.g., packets) from devices in the system 100 (e.g., as shown in FIG. 1) and to send communications to devices in the system 100. For example, the ports 502 may be configured to send/receive data packets to/from the servers such as server 140 and to/from the spine switches 135. The ports are coupled to the switch ASIC 504. The switch ASIC 504 enables packets received by the leaf switch device 125 to be forwarded to the appropriate device in the system 100. For example, when the leaf switch device 125 receives a packet at a first port, the switch ASIC 504 determines a second port on which the packet should be forwarded in the network. That is, if a packet is received at the first port from server 140, the switch ASIC 504 may determine to forward the packet to the second port, which may service a spine switch 135.

The switch ASIC 504 is coupled to the processor 506. The processor 506 is, for example, a microprocessor or microcontroller that is configured to execute program logic instructions (i.e., software) for carrying out various operations and tasks of the leaf switch device 125, as described herein. The memory unit 508 is configured to store information associated with subnet routes, host routes and default routes of received packets. The functions of the processor 506 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 508 may comprise read only memory (ROM), random access memory (RAM), magnetic disk storage media devices, optical storage media devices, flash memory devices, electrical, optical, or other physical/tangible (non-transitory) memory storage devices. The memory 508 stores software instructions for address conflict detection and management logic 510 and for host verification procedure logic 515, both of which contain instructions for executing techniques presented herein and described above in connection with FIGS. 1-4. Thus, in general, memory 508 may comprise one or more computer readable storage media (e.g., a memory storage device) encoded with software comprising computer executable instructions and when the software is executed (e.g., by the processor 506), it is operable to perform the techniques described herein for address conflict detection and management logic 510 and host verification procedure logic 515.

The address conflict detection and management logic 510 and host verification procedure logic 515 may take any of a variety of forms, so as to be encoded in one or more tangible computer readable memory media or storage devices for execution, such as fixed logic or programmable logic (e.g., software/computer instructions executed by a processor). The processor 506 may be an ASIC that comprises fixed digital logic, or a combination thereof.

It should be appreciated that the techniques described above in connection with all embodiments may be performed by one or more computer readable storage media that is encoded with software comprising computer executable instructions to perform the methods and steps described herein. For example, the operations performed by one or more of the leaf switches may be performed by one or more computer or machine readable storage media (non-transitory) or device executed by a processor and comprising software, hardware or a combination of software and hardware to perform the techniques described herein.

In summary, a method is provided comprising: at a network element in a network including a plurality of network elements, receiving, from a first host associated with the network element, a configuration message comprising an Internet Protocol (IP) address. The method further comprises detecting that the IP address is already in use by a second host associated with a second network element, and providing a request message to the second network element, the request message configured to cause the second network element to attempt to contact the second host; receiving a reply message from the second network element. If the reply message indicates that the second host exists at the second network element, the method comprises generating an indication of a misconfiguration event, and if the reply message indicates that the second host does not exist at the second network element, associating the IP address with the first host.

An apparatus is also provided, comprising: a plurality of network ports, a switch unit coupled to the plurality of network ports, and a processor coupled to the switch unit configured receive at a first leaf network element in a network including a plurality of leaf network elements connected to each of a plurality of spine network elements, from a first host, a configuration message comprising an Internet Protocol (IP) address. The processor is further configured to detect that the IP address is already in use by a second host associated with a second leaf network element, and provide a request message to the second leaf network element, the request message configured to cause the second leaf network element to attempt to contact the second host. The processor is configured to receive a reply message from the second leaf network element. If the reply message indicates that the second host exists at the second leaf network element, the processor is configured to generate an indication of a misconfiguration event, and if the reply message indicates that the second host does not exist at the second leaf network element, associate the IP address with the first host.

A computer-readable storage media is also provided which is encoded with software comprising computer executable instructions and when the software is executed operable to receive, from a first host associated with the computer-readable storage media, a configuration message comprising an Internet Protocol (IP) address, wherein the computer-readable storage media is associated with a network including a plurality of leaf network elements connected to each of a plurality of spine network elements. The instructions encoded on the computer-readable storage media are operable to detect that the IP address is already in use by a second host associated with a second leaf network element, and provide a request message to the second leaf network element, the request message configured to cause the second leaf network element to attempt to contact the second host. The instructions are further operable to receive a reply message from the second leaf network element. If the reply message indicates that the second host exists at the second leaf network element, the instructions are operable to generate an indication of a misconfiguration event, and if the reply message indicates that the second host does not exist at the second leaf network element, associate the IP address with the first host.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
    at a network element in an underlay network including a plurality of network elements, receiving, from a first virtual host associated with the network element, a configuration message comprising an Internet Protocol (IP) address;
    detecting that the IP address is already in use by a second virtual host associated with a second network element by querying address information stored on the network element;
    providing a request message to the second network element, the request message configured to cause the second network element to attempt to contact the second virtual host;
    receiving a reply message from the second network element;
    if the reply message indicates that the second virtual host exists at the second network element, generating an indication of a misconfiguration event; and
    if the reply message indicates that the second virtual host does not exist at the second network element, associating the IP address with the first virtual host.

2. The method of claim 1, wherein detecting that the IP address is already in use comprises:
    querying a management controller to determine if the first virtual host is associated with a valid event;
    receiving a query response from the management controller; and
    if the query response indicates that the first virtual host is associated with a valid event, associating the IP address with the first virtual host.

3. The method of claim 2, wherein the valid event is selected from a group consisting of:
    a virtual machine mobility event, and a network interface card (NIC) failover event.

4. The method of claim 1, wherein generating an indication of a misconfiguration event comprises notifying the first virtual host that the IP address is already in use.

5. The method of claim 1, wherein the plurality of network elements are leaf switches connected to each other in a network fabric by a plurality of spine switches.

6. The method of claim 5, further comprising:
    detecting that a number of misconfiguration events in the log exceeds a pre-defined threshold; and
    disabling a port on the network element associated with the first virtual host.

7. The method of claim 1, wherein associating the IP address with the first virtual host further comprises providing routes to other network elements in the network.

8. An apparatus comprising:
    a plurality of network ports;
    a switch unit coupled to the plurality of network ports;
    a processor coupled to the switch unit, and configured to:
        receive at a first leaf network element in a network including a plurality of leaf network elements connected to each of a plurality of spine network elements, from a first virtual host, a configuration message comprising an Internet Protocol (IP) address;
        detect that the IP address is already in use by a second virtual host associated with a second leaf network element by querying address information stored on the first leaf network element;
        provide a request message to the second leaf network element, the request message configured to cause the second leaf network element to attempt to contact the second virtual host;
        receive a reply message from the second leaf network element;
        if the reply message indicates that the second virtual host exists at the second leaf network element, generate an indication of a misconfiguration event; and
        if the reply message indicates that the second virtual host does not exist at the second leaf network element, associate the IP address with the first virtual host.

9. The apparatus of claim 8, wherein to detect that the IP address is already in use, the processor is configured to:
    query a management controller to determine if the first virtual host is associated with a valid event;
    receive a query response from the management controller; and
    if the query response indicates that the first virtual host is associated with a valid event, associate the IP address with the first virtual host.

10. The apparatus of claim 9, wherein the valid event is selected from a group consisting of:

a virtual machine mobility event, and a network interface card (NIC) failover event.

11. The apparatus of claim 8, wherein the processor is configured to notify the first virtual host that the IP address is already in use.

12. The apparatus of claim 8, wherein the processor is configured to log the misconfiguration event in a log.

13. The apparatus of claim 12, wherein the processor is further configured to:
   detect that a number of misconfiguration events in the log exceeds a pre-defined threshold; and
   disable a port on the apparatus associated with the first virtual host.

14. The apparatus of claim 8, wherein the processor is configured to associate the IP address with the first virtual host by providing routes to other leaf network elements in the network.

15. A non-transitory computer readable storage media encoded with software comprising computer executable instructions and when the software is executed operable to:
   receive at a first leaf network element, from a first virtual host, a configuration message comprising an Internet Protocol (IP) address, wherein the first leaf network element is in a network including a plurality of leaf network elements connected to each of a plurality of spine network elements;
   detect that the IP address is already in use by a second virtual host associated with a second leaf network element by querying address information stored on the first leaf network element;
   provide a request message to the second leaf network element, the request message configured to cause the second leaf network element to attempt to contact the second virtual host;
   receive a reply message from the second leaf network element;
   if the reply message indicates that the second virtual host exists at the second leaf network element, generate an indication of a misconfiguration event; and
   if the reply message indicates that the second virtual host does not exist at the second leaf network element, associate the IP address with the first virtual host.

16. The non-transitory computer readable storage media of claim 15, wherein the instructions operable to detect that the IP address is already in use comprise instructions operable to:
   query a management controller to determine if the first virtual host is associated with a valid event;
   receive a query response from the management controller; and
   if the query response indicates that the first virtual host is associated with a valid event, associate the IP address with the first virtual host.

17. The non-transitory computer readable storage media of claim 15, wherein the instructions operable to generate an indication of a misconfiguration event comprise instructions operable to notify the first virtual host that the IP address is already in use.

18. The non-transitory computer readable storage media of claim 15, wherein the instructions operable to generate an indication of a misconfiguration event comprise instructions operable to log the misconfiguration event in a log.

19. The non-transitory computer readable storage media of claim 18, further comprising instructions operable to:
   detect that a number of misconfiguration events in the log exceeds a pre-defined threshold; and
   disable a port associated with the first virtual host.

20. The non-transitory computer readable storage media of claim 16, wherein the valid event is selected from a group consisting of: a virtual machine mobility event, and a network interface card (NIC) failover event.

* * * * *